United States Patent
Tottosi

(10) Patent No.: US 12,344,792 B2
(45) Date of Patent: Jul. 1, 2025

(54) COMPOSITION FOR TEMPORARILY-HYDROPHOBIC AND OIL-ABSORBENT BIOREMEDIATION AGENT

(71) Applicant: Attila Tottosi, Sarasota, FL (US)

(72) Inventor: Attila Tottosi, Sarasota, FL (US)

( * ) Notice: Subject to any disclaimer, the term of this patent is extended or adjusted under 35 U.S.C. 154(b) by 784 days.

(21) Appl. No.: 17/691,920

(22) Filed: Mar. 10, 2022

(65) Prior Publication Data

US 2022/0290023 A1   Sep. 15, 2022

Related U.S. Application Data

(60) Provisional application No. 63/159,137, filed on Mar. 10, 2021.

(51) Int. Cl.
| | |
|---|---|
| C09K 3/00 | (2006.01) |
| C02F 1/66 | (2023.01) |
| C02F 1/68 | (2023.01) |
| C02F 3/34 | (2023.01) |
| C09K 3/32 | (2006.01) |
| C02F 101/32 | (2006.01) |
| C02F 103/08 | (2006.01) |

(52) U.S. Cl.
CPC ............... C09K 3/32 (2013.01); C02F 1/66 (2013.01); C02F 1/682 (2013.01); C02F 3/342 (2013.01); C02F 2101/32 (2013.01); C02F 2103/08 (2013.01)

(58) Field of Classification Search
None
See application file for complete search history.

(56) References Cited

U.S. PATENT DOCUMENTS

| | | |
|---|---|---|
| 1,045,695 A | 11/1912 | Goldwater |
| 2004/0065266 A1 | 4/2004 | Fernandez |
| 2005/0090405 A1 | 4/2005 | Growcock et al. |
| 2005/0175577 A1 | 8/2005 | Jenkins et al. |
| 2009/0194217 A1 | 8/2009 | Filbert |
| 2016/0298037 A1 | 10/2016 | Rehage |
| 2018/0037876 A1 | 2/2018 | Graycar et al. |
| 2020/0325081 A1* | 10/2020 | Robbins .................. C05D 1/00 |

OTHER PUBLICATIONS

Coral Reef Restoration and Rebuilding Dead Coral Reefs, Retrieved from Internet, Retrieved on Feb. 27, 2022 <URL: https://www.greenoceanfarming.com/Coral-Restoration.php>.

* cited by examiner

*Primary Examiner* — Jyoti Nagpaul

(57) ABSTRACT

A composition for temporarily-hydrophobic and oil-absorbent powder. The present invention cleans and neutralizes oily and toxic substances from items in water of bodies of water such as ocean floors or along the surface of bodies of water. The present invention initially repels water or water-based substances and then absorbs oil-based substances. The composition includes a quantity of quicklime, a quantity of oil, a quantity of earthworm enzymes, a quantity of water, a quantity of detergent, and a quantity of rubbing alcohol. The quantity of quicklime, the quantity of oil, the quantity of earthworm enzymes, the quantity of water, the quantity of detergent, and the quantity of rubbing alcohol are heterogeneously mixed into an absorbent slurry blend.

19 Claims, 6 Drawing Sheets

Final Slurry Mixture

| Quantity of absorbent slurry blend | Quantity of ashes |

FIG. 5

COMPOSITION FOR TEMPORARILY-HYDROPHOBIC AND OIL-ABSORBENT BIOREMEDIATION AGENT

The current application claims a priority to the U.S. provisional patent application Ser. No. 63/159,137 filed on Mar. 10, 2021.

FIELD OF THE INVENTION

The present invention generally relates to compositions for bioremediation agents. More specifically, the present invention is a composition for temporarily-hydrophobic and oil-absorbent bioremediation agent.

BACKGROUND OF THE INVENTION

Coral bleaching is driven by various factors including increasing ocean temperatures, acidification, biological, chemical pollution, and so on. Coral reefs are categorized as living animals, and when bleaching occurs, the symbiotic algae species leave the coral reef. When coral reefs vanish completely, coral reefs turn into a white color. The symbiotic species then depends on the surrounding coral communities as their living environment. Consequently, algae, fishes, crabs, polyps, microorganisms, and other organisms leave as the coral reef continues to die, erodes, and the carbonate structure begins to decalcify from the acidic water. There is no immediate solution for cleaning, treating, and revitalizing coral reefs in a natural habitat or in laboratory environments while using enzymatic calcium-rich absorbent agents.

The present invention balances the PH in the water body and in surface waters where phytoplankton and photosynthesizing plant-like microorganisms exist. Acidification decalcifies the phytoplankton (coccolithophores) carbonate exterior structure and in this case their carbon-dioxide absorbing, and oxygen-producing capability is damaged, it cannot fulfill its full role. Applying the present invention on the coral reef revitalizes the phytoplankton and photosynthesizing plant-like microorganisms so that the phytoplankton and photosynthesizing plant-like microorganisms can fulfill their role in the carbon cycle.

In addition, adding cremated human and animal ashes with the present invention and disposing the present invention in the body of water on targeted hard surfaces, including but not limited to, healthy coral reefs, diseased coral reefs, bleached coral reefs or artificial coral reefs and other artificial items underwater. The present invention remains in a powdery state without being dissolved.

BRIEF DESCRIPTION OF THE DRAWINGS

FIG. 5 is a block diagram of further embodiments of the present invention with a quantity of ashes.

DETAIL DESCRIPTIONS OF THE INVENTION

All illustrations of the drawings are for the purpose of describing selected versions of the present invention and are not intended to limit the scope of the present invention.

The present invention is a composition for temporarily-hydrophobic and oil-absorbent powder. The present invention cleans and neutralizes oily and toxic substances from items in water of bodies of water such as ocean floors or along the surface of bodies of water. The present invention initially repels water or water-based substances and then absorbs oil-based substances. Consequently, the present invention may be utilized to clean items underwater such as corals. The present invention reverses the effects of bleached coral reefs by cleaning, treating, conserving, and revitalizing the coral reefs. Moreover, the present invention revives coral reefs from a dead-skeleton status. The present invention provides a complete renovation for skeleton coral reefs and makes the coral reefs fit for new life for symbiotic species. Furthermore, the present invention balances the pH-value of the water while dissolving in the water, thereby serving as an ocean-alkalinity enhancement. As the present invention loses hydrophobic properties, the present invention then applies active agents directly on items underwater at varying depths. Moreover, depending on the depth, pressure, and other environmental factors of a body of water, the absorbent capacity of the present invention may be adjusted and as well as the timing of when the present invention stops being hydrophobic. Once the present invention makes contact with surfaces such as the surfaces of coral reefs, the present invention absorbs oily, toxic layers that covers the surfaces while simultaneously repelling water. The present invention may be applied directly onto surface of items directly or applied to the surface of water being contained within a pad. The pad is able to remain suspended on the surface of water. Then, the present invention neutralizes the oily, toxic layers. More specifically, the present invention serves as a carrier for active or inactive ingredients that would otherwise dissolve in water or water-based substances.

Figure 1:
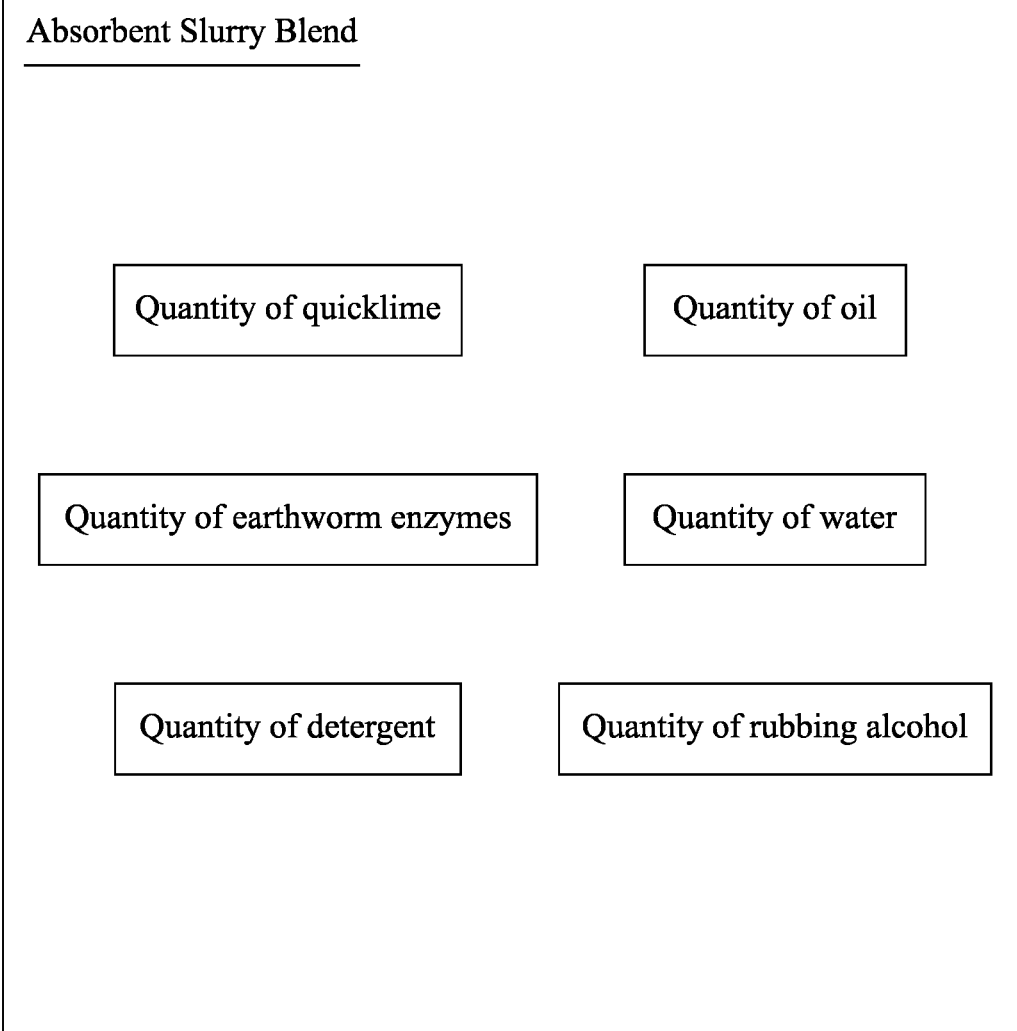
FIG. 1 is a block diagram of a preferred embodiment of the present invention.

In order to encapsulate and carry water-soluble ingredients to targeted items underwater, the present invention comprises a quantity of quicklime, a quantity of oil, a quantity of earthworm enzymes, a quantity of water, a quantity of detergent, and a quantity of rubbing alcohol, seen in FIG. 1. The quantity of quicklime provides a high supply of calcium that absorbs oily and toxic substances on the surface of an item. The quantity of oil encapsulates the water-soluble ingredients. Depending on the strength of the quantity of oil, the preset invention loses hydrophobic properties more quickly or more slowly and the water-soluble ingredients are released into the surrounding environment. The quantity of oil is selected from a group consisting of a quantity of corn oil, a quantity of canola oil, a quantity of sunflower oil, and combinations thereof. The quantity of oil provides a supply of fatty acids, preferably oleic acid or linoleic acid. Additional fatty acids may be, but are not limited to, palmitic acid and stearic acid. More specifically, the quantity of corn oil and the quantity of sunflower oil provide linoleic acid, the quantity of canola oil provides oleic acid. The quantity of earthworm enzymes neutralizes and biodegrades any oily substance. Moreover, the quantity of quicklime and the quantity of earthworm enzymes are released once the quantity of oil dissolves and the absorbent slurry blend is no longer hydrophobic. As the quantity of earthworm enzymes is pure organic protein and has such a small particle size, the quantity of earthworm enzymes remains encapsulated under the hydrophobic layer.

Once released, the quantity of earthworm enzymes bioremediates and decontaminates the surface. The quantity of water, the quantity of detergent, the quantity of rubbing alcohol assist the chemical reactions between the ingredients and thoroughly detoxify surfaces.

Figure 2:
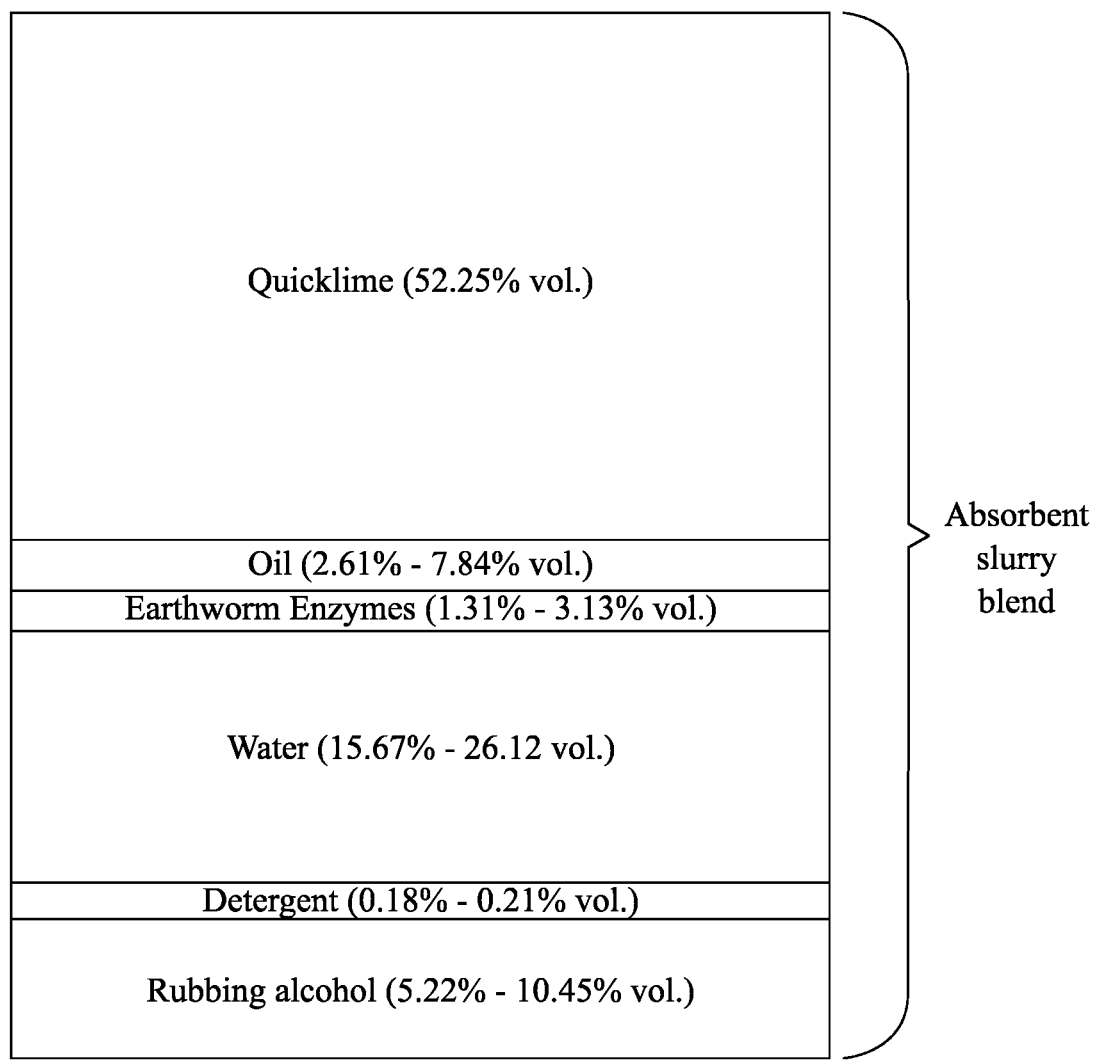
FIG. 2 is a block diagram illustrating the proportions of the preferred embodiment of the present invention.

The quantity of quicklime, the quantity of oil, the quantity of earthworm enzymes, the quantity of water, the quantity of detergent, and the quantity of rubbing alcohol are homogenously mixed into an absorbent slurry blend, seen in FIG. 1 and FIG. 2. More specifically, the quantity of oil, the quantity of earthworm enzymes, the quantity of water, the quantity of detergent, and the quantity of rubbing alcohol are added and mixed in a container. The container is covered with a cloth to allow pressure to be released. Then, the quantity of quicklime is added to the container and mixed until any powdery steam is gone, and the temperature of the absorbent slurry blend has lowered. The absorbent slurry blend remains in the container until fully cooled. The quantity of quicklime, the quantity of oil, the quantity of earthworm enzymes, the quantity of water, the quantity of detergent, and the quantity of rubbing alcohol are able to chemically react and lose the hydrophobic property and the absorbent slurry blend releases components into the water. Moreover, part of the absorbent slurry blend dissolves in water and part of the absorbent slurry blend reacts with the surfaces of an item, cleans the surfaces, and builds a carbonate structure on the item, such as a coral reef. As the absorbent slurry blend is a high-pH value, calcium-rich formula, once the absorbent slurry blend loses the hydrophobic property, alkaline is released into the water and balances the pH value. The absorbent slurry blend therefore provides the necessary amount of alkalinity in the water, thereby eliminating acidification and balancing pH-value.

In order to maintain the correct pH-value of the present invention while reacting with surfaces of an item, the quantity of quicklime is preferably approximately 52.25 percentage by volume (vol.%) of the absorbent slurry blend at normal temperature and pressure (NTP), seen in FIG. 2. Furthermore, the quantity of oil is approximately 2.61 vol.% to 7.84 vol.% of the absorbent slurry blend at NTP. Furthermore, the quantity of earthworm enzymes is approximately 1.31 vol.% to 3.13 vol.% of the absorbent slurry blend at NTP. Furthermore, the quantity of water is approximately 15.67 vol.% to 26.12 vol.% of the absorbent slurry blend at NTP. Furthermore, the quantity of detergent is approximately 0.18 vol.% to 0.21 vol.% of the absorbent slurry blend at NTP. Furthermore, the quantity of rubbing alcohol is approximately 5.22 vol.% to 10.45 vol.% of the absorbent slurry blend at NTP. In reference to the aforementioned compositional proportions, the term "approximately" preferably means within an error range of up to ±0.005 wt. %.

Figure 3:
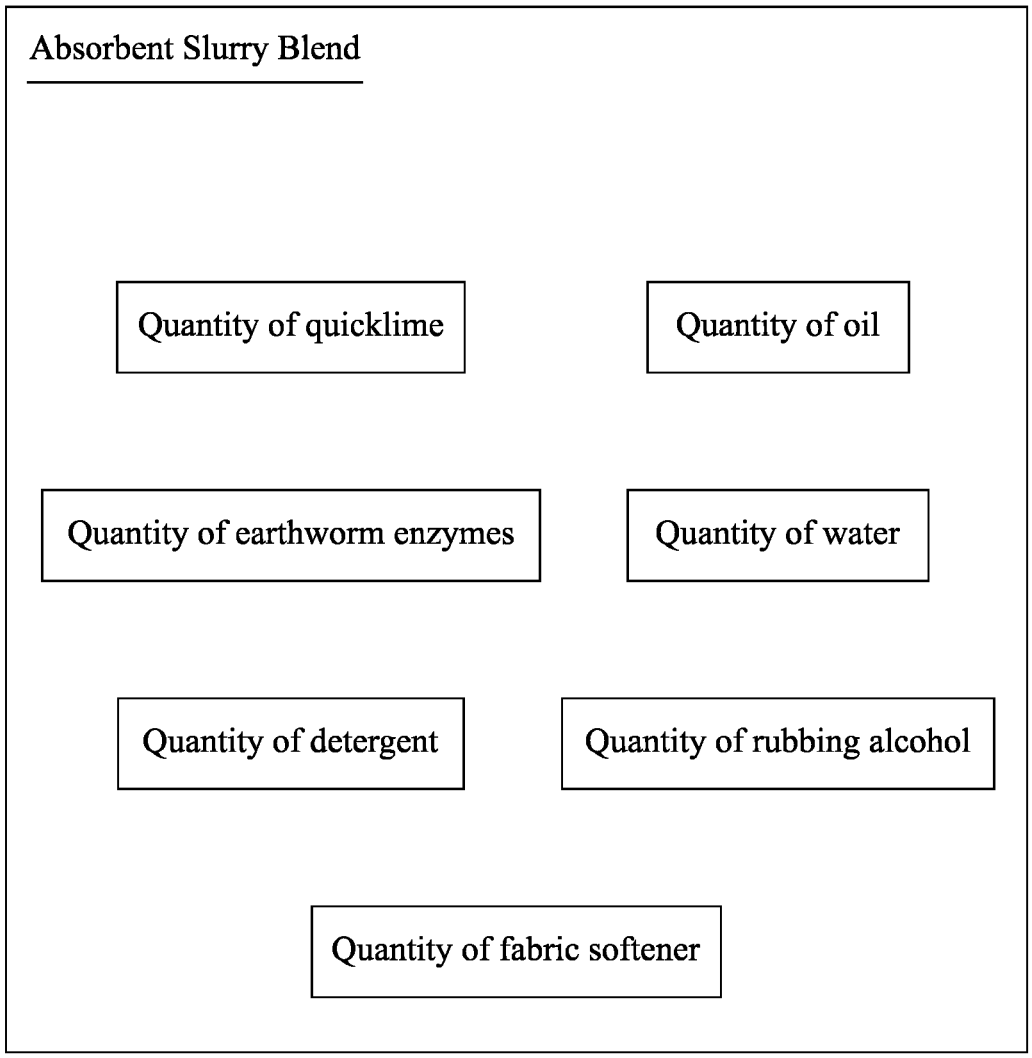
FIG. 3 is a block diagram of an alternate embodiment of the present invention.
Figure 4:
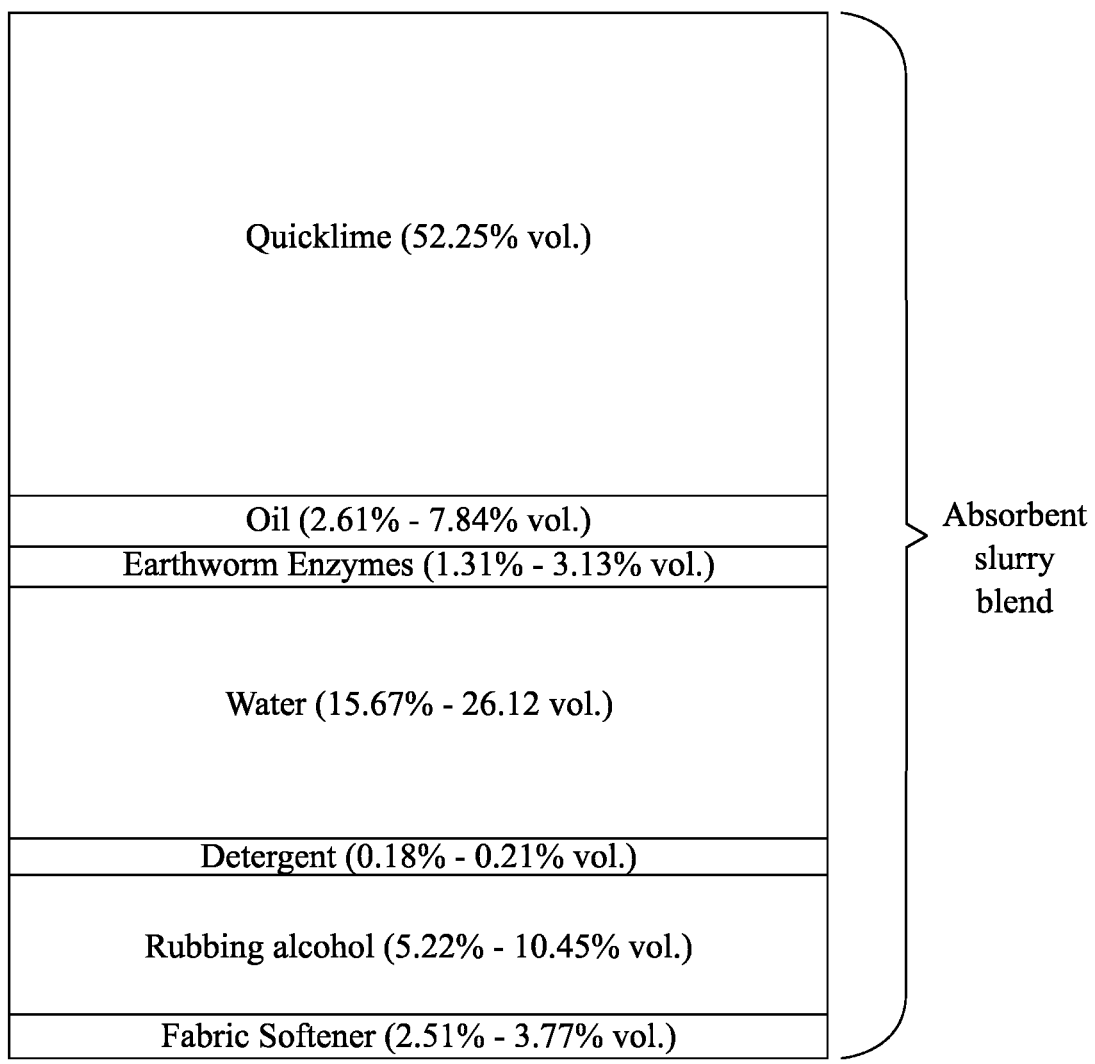
FIG. 4 is a block diagram illustrating the proportions of the alternate embodiment of the present invention.

In an alternate embodiment of the present invention further comprise a quantity of fabric softener, seen in FIG. 3. The quantity of fabric softener assists the chemical reactions between the ingredients and thoroughly detoxify surfaces. More specifically, the quantity of fabric softener positively charges the absorbent slurry blend, whereas in the preferred embodiment, the absorbent slurry blend is negatively charged. The quantity of fabric softener is integrated with the absorbent slurry blend as the quantity of fabric softener is further homogeneously mixed into the absorbent slurry blend, as seen in FIG. 4. The quantity of fabric softener is approximately 2.51 vol.% to 3.77 vol.% of the absorbent slurry blend at NTP. In this alternate embodiment of the present invention, the quantity of quicklime is approximately 50.28 vol.% of the absorbent slurry blend at NTP. Furthermore, the quantity of oil is approximately 2.51 vol.% to 7.54 vol.% of the absorbent slurry blend at NTP. Furthermore, the quantity of earthworm enzymes is approximately 1.26 vol.% to 3.02 vol.% of the absorbent slurry blend at NTP. Furthermore, the quantity of water is approximately 15.08 vol.% to 25.14 vol.% of the absorbent slurry blend at NTP. Furthermore, the quantity of detergent is approximately 0.17 vol.% to 0.20 vol.% of the absorbent slurry blend at NTP. Furthermore, the quantity of rubbing alcohol is approximately 5.03 vol.% to 10.05 vol.% of the absorbent slurry blend at NTP. In reference to the aforementioned compositional proportions, the term "approximately" preferably means within an error range of up to ±0.005 wt. %.

Figure 6:
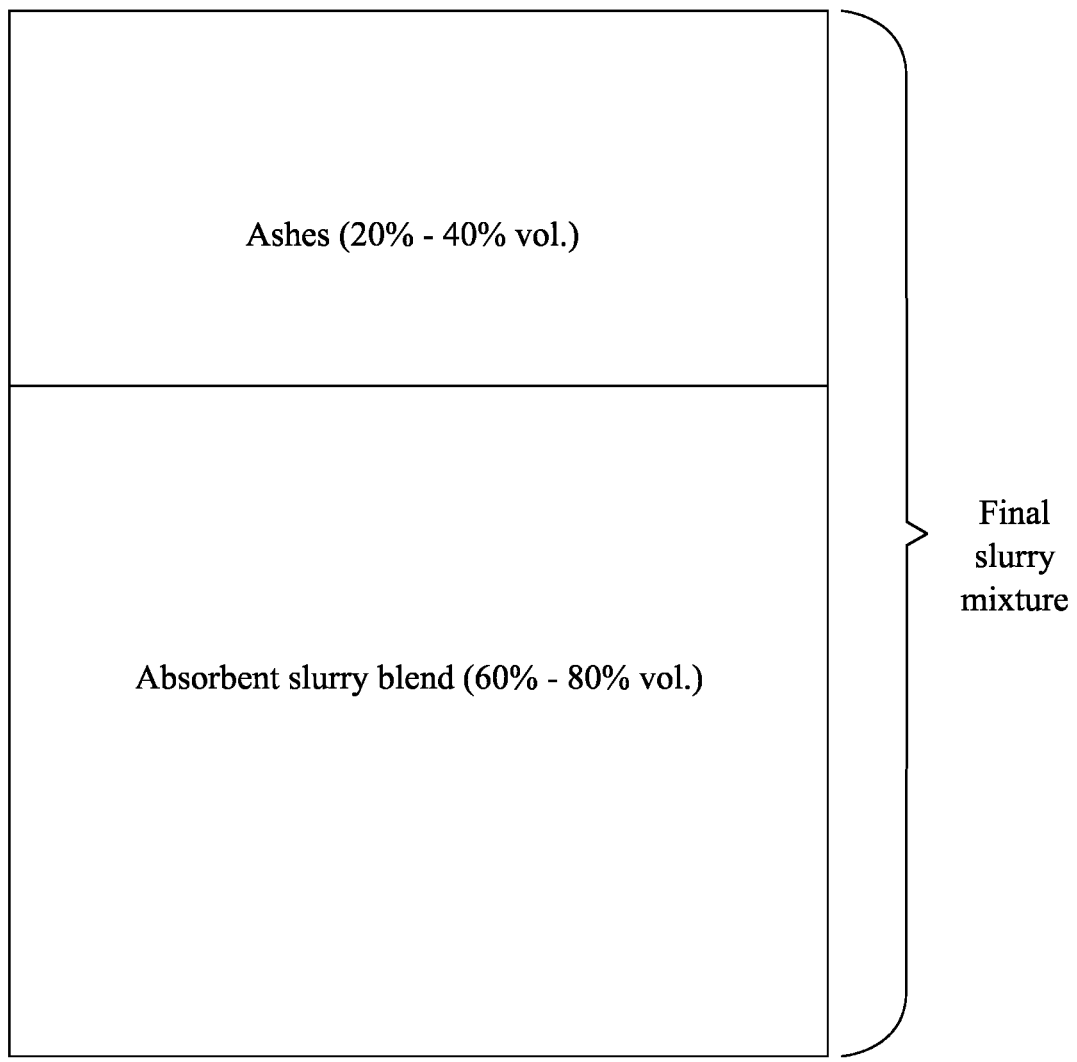
FIG. 6 is a block diagram illustrating the proportions of the further embodiments of the present invention.

Further embodiments of the present invention comprise a quantity of ashes, seen in FIG. 5. The quantity of ashes is released once the quantity of oil dissolves and the absorbent slurry blend is no longer hydrophobic. The quantity of ashes provides calcium phosphates and minerals in the form of sodium and potassium. Moreover, the quantity of ashes is mildly acidic. In order to balance the mildly acidic quality of the quantity of ashes, the quantity of ashes and the quantity of absorbent slurry blend are heterogeneously mixed into a final slurry mixture which provides a balanced pH value for these alternate embodiments of the present invention, as seen in FIG. 6. The final slurry mixture is able to build a carbonate structure across the surfaces of the item, preferably coral reefs. The quantity of ashes is preferably approximately 20 vol.% to 40 vol.% of the final slurry mixture at NTP, and the quantity of absorbent slurry blend is preferably approximately 60 vol.% to 80 vol.% of the final powdered mixture at NTP.

In order to effectively apply the present invention to surfaces of an item or coral reefs in bodies of water, the present invention is preferably filled into an applicator container and dispensed from the applicator container with an applicator gun. The applicator gun maybe manually operated or electrically operated. Moreover, the applicator container may vary in size to accommodate 5 pounds to 10 pounds of the present invention. The applicator gun is preferably operated by divers who direct the applicator gun to hard surfaces, including but not limited to, surface of healthy coral reeds, diseased coral reeds, bleached coral reeds, and artificial coral reefs.

In order to effectively apply the present invention on surface of an item in a laboratory setting, a quantity of diluted organic enzymes is applied on the surfaces of an item. The quantity of diluted organic enzymes sits on the surface of approximately 24 hours. If the item is alive and needs to remain in water, the quantity of diluted organic enzymes is applied twice within 24 hours, preferably every 12 hours. Alternatively, live item, such as a coral, may remain out of the water for an hour and then moved into the water. After 24 hours, the item is ready to receive the absorbent slurry blend or the final slurry mixture. In order to apply the absorbent slurry blend by placing the absorbent slurry blend or the final slurry mixture into a glass tank. The item, preferably still wet, is positioned into the glass tank. Moreover, the item is turned and dipped by hand to coat each surface with the absorbent slurry blend or the final slurry mixture.

Although the invention has been explained in relation to its preferred embodiment, it is to be understood that many other possible modifications and variations can be made without departing from the spirit and scope of the invention as hereinafter claimed.

What is claimed is:

1. A composition for temporarily-hydrophobic and oil-absorbent bioremediation agent comprising:
   a quantity of quicklime;
   a quantity of oil;
   a quantity of earthworm enzymes;
   a quantity of water;
   a quantity of detergent;
   a quantity of rubbing alcohol; and
   the quantity of quicklime, the quantity of oil, the quantity of earthworm enzymes, the quantity of water, the quantity of detergent, and the quantity of rubbing alcohol being homogenously mixed into an absorbent slurry blend.

2. The composition for temporarily-hydrophobic and oil-absorbent bioremediation agent claimed in claim 1 comprising:
   the quantity of quicklime being approximately 52.25 percentage by volume (vol.%) of the absorbent slurry blend at normal temperature and pressure (NTP).

3. The composition for temporarily-hydrophobic and oil-absorbent bioremediation agent claimed in claim 1 comprising:
   the quantity of oil being approximately 2.61 vol.% to 7.84 vol.% of the absorbent slurry blend at NTP.

4. The composition for temporarily-hydrophobic and oil-absorbent bioremediation agent claimed in claim 1 comprising:
   the quantity of earthworm enzymes being approximately 1.31 vol.% to 3.13 vol.% of the absorbent slurry blend at NTP.

5. The composition for temporarily-hydrophobic and oil-absorbent bioremediation agent claimed in claim 1 comprising:
   the quantity of water being approximately 15.67 vol.% to 26.12 vol.% of the absorbent slurry blend at NTP.

6. The composition for temporarily-hydrophobic and oil-absorbent bioremediation agent claimed in claim 1 comprising:
   the quantity of detergent being approximately 0.18 vol.% to 0.21 vol.% of the absorbent slurry blend at NTP.

7. The composition for temporarily-hydrophobic and oil-absorbent bioremediation agent claimed in claim 1 comprising:
   the quantity of rubbing alcohol being approximately 5.22 vol.% to 10.45 vol.% of the absorbent slurry blend at NTP.

8. The composition for temporarily-hydrophobic and oil-absorbent bioremediation agent claimed in claim 1 comprising:
   a quantity of fabric softener;
   the quantity of fabric softener being further homogeneously mixed into the absorbent slurry blend.

9. The composition for temporarily-hydrophobic and oil-absorbent bioremediation agent claimed in claim 8 comprising:
   the quantity of fabric softener being approximately 2.51 vol.% to 3.77 vol.% of the absorbent slurry blend at NTP.

10. The composition for temporarily-hydrophobic and oil-absorbent bioremediation agent claimed in claim 8 comprising:
    the quantity of quicklime being approximately 50.28 vol.% of the absorbent slurry blend at NTP.

11. The composition for temporarily-hydrophobic and oil-absorbent bioremediation agent claimed in claim 8 comprising:
    the quantity of oil being approximately 2.51 vol.% to 7.54 vol.% of the absorbent slurry blend at NTP.

12. The composition for temporarily-hydrophobic and oil-absorbent bioremediation agent claimed in claim 8 comprising:
    the quantity of earthworm enzymes being approximately 1.26 vol.% to 3.02 vol.% of the absorbent slurry blend at NTP.

13. The composition for temporarily-hydrophobic and oil-absorbent bioremediation agent claimed in claim 8 comprising:
    the quantity of water being approximately 15.08 vol.% to 25.14 vol.% of the absorbent slurry blend at NTP.

14. The composition for temporarily-hydrophobic and oil-absorbent bioremediation agent claimed in claim 8 comprising:
    the quantity of detergent being approximately 0.17 vol.% to 0.20 vol.% of the absorbent slurry blend at NTP.

15. The composition for temporarily-hydrophobic and oil-absorbent bioremediation agent claimed in claim 8 comprising:
    the quantity of rubbing alcohol being approximately 5.03 vol.% to 10.05 vol.% of the absorbent slurry blend at NTP.

16. The composition for temporarily-hydrophobic and oil-absorbent bioremediation agent claimed in claim 1 comprising:
    a quantity of ashes;
    the quantity of ashes and the quantity of absorbent slurry blend being heterogeneously mixed into a final slurry mixture.

17. The composition for temporarily-hydrophobic and oil-absorbent bioremediation agent claimed in claim 16 comprising:
    the quantity of ashes being approximately 20 vol.% to 40 vol.% of the final slurry mixture at NTP.

18. The composition for temporarily-hydrophobic and oil-absorbent bioremediation agent claimed in claim 16 comprising:
    the quantity of absorbent slurry blend being approximately 60 vol.% to 80 vol.% of the final powdered mixture at NTP.

19. The composition for temporarily-hydrophobic and oil-absorbent bioremediation agent claimed in claim 1 is selected from a group consisting of: a quantity of corn oil, a quantity of canola oil, a quantity of sunflower oil, and combinations thereof.

* * * * *